United States Patent
Yu et al.

(10) Patent No.: US 9,083,036 B2
(45) Date of Patent: Jul. 14, 2015

(54) SEPARATOR COMPRISING MICROCAPSULES AND ELECTROCHEMICAL DEVICE HAVING THE SAME

(71) Applicant: LG Chem, Ltd., Seoul (KR)

(72) Inventors: Hyung-Kyun Yu, Daejeon (KR); Jong-Hun Kim, Daejeon (KR); Jang-Hyuk Hong, Daejeon (KR); In-Chul Kim, Daejeon (KR); Joo-Sung Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/144,849

(22) Filed: Dec. 31, 2013

(65) Prior Publication Data
US 2014/0120402 A1    May 1, 2014

Related U.S. Application Data

(63) Continuation of application No. PCT/KR2012/006841, filed on Aug. 27, 2012.

(30) Foreign Application Priority Data

Aug. 25, 2011    (KR) ............ 10-2011-0085079
Aug. 27, 2012    (KR) ............ 10-2012-0093715

(51) Int. Cl.
     *H01M 2/16*      (2006.01)
     *H01M 10/052*      (2010.01)

(52) U.S. Cl.
     CPC ............ *H01M 2/1686* (2013.01); *H01M 2/166* (2013.01); *H01M 10/052* (2013.01)

(58) Field of Classification Search
None
See application file for complete search history.

(56) References Cited

U.S. PATENT DOCUMENTS 7,592,095 B2    9/2009    Lee et al.
2006/0008700 A1*    1/2006    Yong et al. ............ 429/144
(Continued)

FOREIGN PATENT DOCUMENTS

DE      10151830 A1      4/2003
JP      H06-283206      10/1994
(Continued)

OTHER PUBLICATIONS

Yu, Lithium Seconday Battery, EP 2 466 678 A2 (WO 2011/019187), Jun. 20, 2010.*
(Continued)

*Primary Examiner* — Patrick Ryan
*Assistant Examiner* — Jose Colucci Rios
(74) *Attorney, Agent, or Firm* — Lerner, David, Littenberg, Krumholz & Mentlik, LLP

(57) ABSTRACT

The present invention refers to a separator, comprising a porous substrate having multiple pores; a porous coating layer formed on at least one area selected from at least one surface of the porous substrate and the pores of the porous substrate, and comprising multiple inorganic particles and a binder polymer, the binder polymer being existed on a part or all of the surface of the inorganic particles to connect and immobilize the inorganic particles therebetween; and microcapsules dispersed in at least one area selected from the pores of the porous substrate and pores formed by vacant spaces between the inorganic particles present in the porous coating layer, and containing therein an additive for improving the performances of an electrochemical device, and an electrochemical device having the same.

22 Claims, 1 Drawing Sheet

(56) References Cited

U.S. PATENT DOCUMENTS

| | | |
|---|---|---|
| 2006/0099510 A1* | 5/2006 | Naarmann et al. ............ 429/232 |
| 2007/0015048 A1* | 1/2007 | Lee et al. ...................... 429/118 |
| 2009/0311585 A1* | 12/2009 | Muraoka et al. ................ 429/94 |
| 2011/0064988 A1 | 3/2011 | Yu |

FOREIGN PATENT DOCUMENTS

| | | |
|---|---|---|
| JP | 2004-119132 A | 4/2004 |
| JP | 2005-108533 A | 4/2005 |
| JP | 2006-187891 A | 7/2006 |
| JP | 2008-169935 A | 7/2008 |
| JP | 2009-134310 A | 6/2009 |
| JP | 2010-027548 A | 4/2010 |
| KR | 10-2006-003665 A | 1/2006 |
| KR | 10-0777126 B1 | 11/2007 |
| WO | 2011/019187 A2 | 2/2011 |

OTHER PUBLICATIONS

Kawakami, Microcapsule Contained Battery, JP-H06283206, Oct. 7, 1994.*

International Search Report for International Patent Application No. PCT/KR2012/006841 mailed Feb. 21, 2013.

Supplemental Search Report from European Application No. 12 82 5578, dated Feb. 16, 2015.

* cited by examiner

SEPARATOR COMPRISING MICROCAPSULES AND ELECTROCHEMICAL DEVICE HAVING THE SAME

CROSS-REFERENCE TO RELATED APPLICATION(S)

This application is a continuation of International Application No. PCT/KR2012/006841 filed on Aug. 27, 2012, which claims priority from Korean Patent Application No. 10-2011-0085079 filed in the Republic of Korea on Aug. 25, 2011 and Korean Patent Application No. 10-2012-0093715 filed in the Republic of Korea on Aug. 27, 2012, the disclosures of which are incorporated herein by reference.

TECHNICAL FIELD

The present invention relates to a separator, and an electrochemical device having the same. More particularly, the present invention relates to a separator comprising microcapsules having a controlled release characteristic, and an electrochemical device having the same.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Also, for the development of a cathode, anode, separator and electrolyte solution comprised in lithium secondary batteries, various additives are used therein. The additives are largely divided into essential additives which are required in the operation of batteries, and additional additives which are further used to ensure the performances and safety of the batteries. Generally, the former essential additives are used in the preparation (manufacturing) of battery components, while the latter additional additives are used in the preparation of the battery components or in the assembling of batteries.

Among such additives, additives for ensuring safety are required in a certain moment, for example, when an overcurrent or high temperature state occurs due the abnormal operation of batteries, while some additives are continuously required in a certain degree during the use of batteries.

Particularly, some additives are intended to activate during the operation cycles of secondary batteries to remove capacity-fading factors and implement more stable cycles. However, since these additives may cause other side reactions, it is important for them to be placed in a suitable position at a required time.

Meanwhile, most of additives for improving cycle performances are focused on an electrolyte solution, cathode and anode. Accordingly, there is need to develop a method for maintaining additives in an efficient position while taking into account a side reaction due to the additives.

DISCLOSURE

Technical Problem

The present invention is designed to solve the problems of the prior art, and therefore it is an object of the present invention to provide a separator capable of the control release of an additive for improving the performances of an electrochemical device, and an electrochemical device having the same.

Technical Solution

In accordance with one aspect of the present invention, there is provided a separator comprising:

a porous substrate having multiple pores;

a porous coating layer formed on at least one area selected from at least one surface of the porous substrate and the pores of the porous substrate, and comprising multiple inorganic particles and a binder polymer, the binder polymer being existed on a part or all of the surface of the inorganic particles to connect and immobilize the inorganic particles therebetween; and microcapsules dispersed in at least one area selected from the pores of the porous substrate and pores formed by vacant spaces between the inorganic particles present in the porous coating layer, and containing therein an additive for improving the performances of an electrochemical device.

The additive for improving the performances of an electrochemical device may be at least one selected from the group consisting of an additive for forming a solid electrolyte interface, an additive for inhibiting a side reaction occurring in a battery, an additive for improving thermal stability, an additive for inhibiting overcharging, and a mixture thereof.

The additive for forming a solid electrolyte interface may be at least one selected from the group consisting of vinylene carbonate, vinylethylene carbonate, fluoroethylene carbonate, a cyclic sulfite, a saturated sultone, an unsaturated sultone, a non-cyclic sulfone, a derivative and halide thereof, and a mixture thereof.

The additive for inhibiting a side reaction occurring in a battery may be at least one selected from the group consisting of ethylenediaminetetraacetic acid, tetramethylethylenediamine, pyridine, dipyridyl, ethylbis(diphenylphosphine), butyronitrile, succinonitrile, iodine, ammonium halide, a derivative thereof, and a mixture thereof.

The additive for improving thermal stability may be at least one selected from the group consisting of hexamethyldisiloxane, hexamethoxycyclotriphosphazene, hexamethylphosphoramide, cyclohexylbenzene, biphenyl, dimethylpyrrole, trimethyl phosphate, triphenyl phosphate, a derivative thereof, and a mixture thereof.

The additive for inhibiting overcharging may be at least one selected from the group consisting of n-butyl ferrocene, a halogen-substituted benzene derivative, cyclohexylbenzene, biphenyl, and a mixture thereof.

The additive for improving the performances of an electrochemical device may be used in an amount of 2 to 20 parts by weight based on 100 parts by weight of the total weight of the inorganic particles and the binder polymer.

The microcapsules may be spherical polymer particles, core/shell-type polymer particles, or blended polymer particles.

The microcapsules may further comprise a coating layer formed with inorganic particles thereon.

The microcapsules may have a surface consisting of a cross-linked polymer.

The microcapsules may have an average diameter of 100 nm to 10 μm.

The microcapsules containing the additive for improving the performances of an electrochemical device may be comprised in an amount of 5 to 50 parts by weight based on 100 parts by weight of the total weight of the inorganic particles and the binder polymer.

The weight ratio of the additive for improving the performances of an electrochemical device and the microcapsules containing the additive may be in the range of 1:1.5 to 1:25.

The porous substrate may be in the form of a porous membrane or non-woven fabric made of a polyolefin-based polymer.

The porous substrate may be obtained from at least one selected from the group consisting of a high-density polyethylene, a low-density polyethylene, a linear low-density polyethylene, an ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenyleneoxide, polyphenylenesulfidro, polyethylenenaphthalene, and a mixture thereof.

The inorganic particles may be at least one selected from the group consisting of inorganic particles having a dielectric constant of 5 or higher, inorganic particles having the ability to transport lithium ions, and a mixture thereof.

The inorganic particles having a dielectric constant of 5 or higher may be at least one selected from the group consisting of $BaTiO_3$, $Pb(Zr_xTi_{1-x})O_3$ (PZT, $0<x<1$), $Pb_{1-x}La_xZr_{1-y}Ti_yO_3$ (PLZT, $0<x<1, 0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$, $TiO_2$ inorganic particles and a mixture thereof.

The inorganic particles having the ability to transport lithium ions may be at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

The binder polymer may be at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, and a mixture thereof.

The weight ratio of the inorganic particles and the binder polymer may be in the range of 50:50 to 99:1.

In accordance with another aspect of the present invention, there is provided an electrochemical device, comprising a cathode, an anode and a separator interposed between the cathode and the anode, wherein the separator is the above-mentioned separator.

The electrochemical device may be a lithium secondary battery.

Advantageous Effects

The present invention provides a separator having controlled release microcapsules containing an additive for improving the performances of an electrochemical device, such as an additive for forming a solid electrolyte interface, an additive for inhibiting a side reaction occurring in a battery, and an additive for improving thermal stability, to release the additive in a desired certain degree, and an electrochemical device having the separator, from which a side reaction by an excess of the additive can be minimized with the provision of the inherent effect of the additive, and ultimately the best performances of the electrochemical device can be maintained.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

Figure 1:
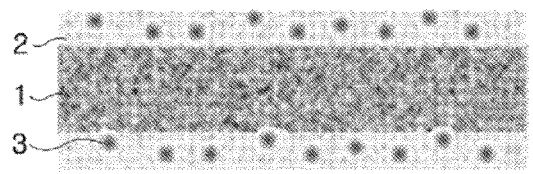
FIG. 1 schematically shows a separator according to one embodiment of the present invention.

EXPLANATION OF REFERENCE NUMERALS 1, 11: Polyolefin-based Porous Membrane
2, 12, 32, 42: Porous Coating Layer
3, 13, 33, 43: Microcapsules
31, 41: Polyolefin-based Non-woven Fabric

BEST MODE

Hereinafter, the present invention will be described in detail with reference to the drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The separator according to one aspect of the present invention comprises a porous substrate having multiple pores; a porous coating layer formed on at least one area selected from at least one surface of the porous substrate and the pores of the porous substrate, and comprising multiple inorganic particles and a binder polymer, the binder polymer being existed on a part or all of the surface of the inorganic particles to connect and immobilize the inorganic particles therebetween; and microcapsules dispersed in at least one area selected from the pores of the porous substrate and pores formed by vacant spaces between the inorganic particles present in the porous coating layer, and containing therein an additive for improving the performances of an electrochemical device.

The additive for improving the performances of an electrochemical device is a material which is essentially or additionally required for the improvement of the operation and performances of the electrochemical device, and may be applied without any particular limitation if it requires a continuous supplement due to its consumption during the operation of the electrochemical device.

Non-limiting examples of the additive for improving the performances of an electrochemical device may include an additive for forming a solid electrolyte interface, an additive for inhibiting a side reaction occurring in a battery, an additive for improving thermal stability, an additive for inhibiting overcharging, and a mixture thereof.

As the additive for forming a solid electrolyte interface, at least one selected from the group consisting of vinylene carbonate, vinylethylene carbonate, fluoroethylene carbonate, a cyclic sulfite, a saturated sultone, an unsaturated sultone, a non-cyclic sulfone, a derivative and halide thereof, and a mixture thereof may be used, but the present invention is not limited thereto.

Examples of the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite; examples of the saturated sultone include 1,3-propane sultone and 1,4-butane sultone; examples of the unsaturated sultone include ethene sultone, 1,3-propene sultone, 1,4-butene sultone and 1-methyl-1,3-propene sultone; and examples of the non-cyclic sulfone include divinyl sulfone, dimethyl sulfone, diethyl sulfone, methyl ethyl sulfone and methyl vinyl sulfone.

As the additive for inhibiting a side reaction occurring in a battery, at least one selected from the group consisting of ethylenediaminetetraacetic acid, tetramethylethylenediamine, pyridine, dipyridyl, ethylbis(diphenylphosphine), butyronitrile, succinonitrile, iodine, ammonium halide, a derivative thereof; and a mixture thereof may be used, but the present invention is not limited thereto.

As the additive for improving thermal stability, at least one selected from the group consisting of hexamethyldisiloxane, hexamethoxycyclotriphosphazene, hexamethylphosphoramide, cyclohexylbenzene, biphenyl, dimethylpyrrole, trimethyl phosphate, triphenyl phosphate, a derivative thereof, and a mixture thereof may be used, but the present invention is not limited thereto.

As the additive for inhibiting overcharging, at least one selected from the group consisting of n-butyl ferrocene, a halogen-substituted benzene derivative, cyclohexylbenzene, biphenyl, and a mixture thereof may be used, but the present invention is not limited thereto.

The derivative of each compound mentioned as the example of the additive for improving the performances of an electrochemical device may include a compound wherein at least one hydrogen atom bonded to the carbon atoms thereof is substituted by a halogen.

The additive for improving the performances of an electrochemical device may be used in an amount of 2 to 20 parts by weight, preferably 4 to 18 parts by weight, more preferably 6 to 15 parts by weight, based on 100 parts by weight of the total weight of the inorganic particles and the binder polymer.

When the amount of the additive satisfies such a range, it is possible to obtain a sufficient addition effect, and prevent a side reaction caused by the release of an excessive additive. Also, the rapid degradation of battery cycles can be prevented.

In the present invention, the microcapsule may contain one additive or two or more additives. In addition, two or more microcapsules each containing independently at least one additive may be used together.

The microcapsule is not limited if it has a form which can support the additive for improving the performances of an electrochemical device. For example, the microcapsule may be in the form of spherical polymer particles or core/shell-type polymer particles obtained by forming spherical polymer particles and then coating the spherical polymer particles with the same or different polymer.

In the case of the core/shell-type polymer particles, a release rate of the additive from the microcapsules can be more effectively controlled if each polymer for a core and shell is suitably selected taking into account molecular permeability.

As the microcapsules come into contact with an electrolyte solution after introducing in the separator, they should be made of a material having chemical stability against the electrolyte solution. For example, the microcapsules may be made of polyethylene, polypropylene, polystyrene, nylon, polycaprolactone, polyethylene terephthalate, polyurethane, gelatin, chitosan, cellulose, polymethyl methacrylate, or a derivative thereof, but are not limited thereto. If necessary, these compounds may be used as a mixture of two or more thereof to form the microcapsules. Also, the microcapsules may be blended polymer particles in which a homopolymer such as polystyrene, polymethacylate and polyethylene is blended with a block copolymer such as polystyrene-polymethacylate and polyethylene oxide-polymethyl methacylate. The blended polymer particles may form multi-layered capsule particles having a core part and two or more shell parts by controlling suitably the kind of polymers used therein.

The microcapsules are required to have a porous surface having micropores and cracks from which the additive may be released to the outside of the microcapsules.

The release degree of the additive may be determined depending on various factors including the size of the additive, a solubility in an electrolyte solution and the size of micropores present in the surface of the microcapsules. The release rate of the additive may be in the range of 1 µg/day to 1 g/day.

The microcapsules may further comprise a coating layer formed with inorganic particles thereon, or a surface consisting of a cross-linked polymer, so as to more enhance the controlled release characteristic of the additive.

Specifically, the additive contained in the microcapsules is released when the inner temperature of an electrochemical device increases during the operation thereof or the surface of the microcapsules swells or is oxidized by the change of a pH value to form a crack. At this time, if the microcapsules are surface-modified to have further a coating layer consisting of inorganic particles such as $SiO_2$ and $TiO_2$ on the surface thereof, as the released additive passes through the porous area of the inorganic particle-coating layer, its controlled release can be achieved in a constant rate without the release of the additive at once.

Also, the microcapsules have a surface consisting of a cross-linked polymer, which may be obtained by further adding a cross-linking agent (e.g., glutaraldehyde and methylenebisacrylamide) to the microcapsules formed from the above-mentioned raw materials to produce a cross-linked structure, or may be obtained by forming the microcapsules themselves from a cross-linked polymer. Thus, if the microcapsules having a cross-linked surface are used in an electrochemical device, surface durability against a change of a pH value or temperature increases to minimize a swelling phenomenon in an electrolyte solution and prevent the additive contained in the microcapsules from being released at once, thereby more improving a controlled release characteristic.

The microcapsule may have an average diameter of 100 nm to 10 μm, preferably 500 nm to 5 μm.

When the average diameter of the microcapsules satisfies such a range, it is possible to prevent the microcapsules from blocking the pores of the separator, and minimize the agglomeration of the microcapsules, thereby improving the dispersibility thereof. Also, within such an average diameter range, the microcapsules can be easily produced and packed in a high density in the separator.

The microcapsules containing the additive for improving the performances of an electrochemical device may be comprised in an amount of 5 to 50 parts by weight, preferably 10 to 30 parts by weight, more preferably 15 to 20 parts by weight, based on 100 parts by weight of the total weight of the inorganic particles and the binder polymer.

When the amount of the microcapsules satisfies such a range, the dispersibility the microcapsules can be improved, the controlled release effect of the additive can be sufficiently obtained, and the performances of battery cycles can be improved.

In addition, the weight ratio of the additive for improving the performances of an electrochemical device and the microcapsule containing the additive may be in the range of 1:1.5 to 1:25, preferably 1:1.7 to 1:15, more preferably 1:2 to 1:10. When the weight ratio of the additive and the microcapsules satisfies such a range, the microcapsules can stably support the additive therein to prevent the leakage of the additive due to the breakage of the microcapsules in the preparation of a separator comprising the microcapsules and an electrochemical device having the separator, thereby effectively controlling the release of the additive during the operation of the electrochemical device.

In the separator according to one aspect of the present invention, the inorganic particles are not particularly limited if they are electrochemically stable. That is, the inorganic particles which may be used in the present invention are not particularly limited unless an oxidation-reduction reaction occurs in an operating voltage range (for example, 0 to 5 V based on Li/Li$^+$) of an applied electrochemical device. Particularly, inorganic particles having ion-transferring ability can increase an ionic conductivity in an electrochemical device to achieve the performance improvement of the device.

Also, inorganic particles having a high dielectric constant may be used to increase a dissociation rate of an electrolyte salt, e.g., a lithium salt, in a liquid electrolyte, thereby improving an ionic conductivity of an electrolyte solution.

For the foregoing reasons, the inorganic particles used in the present invention preferably include inorganic particles having a dielectric constant of 5 or higher, preferably 10 or higher, inorganic particles having the ability to transport lithium ions, or a mixture thereof.

Non-limiting examples of the inorganic particles having a dielectric constant of 5 or higher include $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1, 0<y<1$), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, $TiO_2$, SiC, inorganic particles and a mixture thereof.

Among these, inorganic particles such as $BaTiO_3$, $Pb(Zr_x,Ti_{1-x})O_3$ (PZT), $Pb_{1-x}La_xZr_{1-y}Ti_yO_3$(PLZT), $Pb(Mg_3Nb_{2/3})O_3$—$PbTiO_3$ (PMN-PT), hafnia ($HfO_2$) have high dielectric characteristic from a dielectric constant of 100 or more, and have piezoelectricity, which can generate a charge when tensioned or compressed by the application of a certain pressure and then a potential difference between both surfaces, to prevent a short circuit due to external impact in both electrodes, thereby improving the safety of electrochemical devices. Also, when the above-mentioned inorganic particles having a high dielectric constant and inorganic particles having the ability to transport lithium ions are mixed with each other, their synergistic effects may increase.

The inorganic particles having the ability to transport lithium ions, i.e., lithium-containing inorganic particles which can transfer lithium ions without holding them, are capable of transporting and transferring lithium ions due to a kind of defect present within a particle structure, thereby improving the conductivity of lithium ions in a battery and ultimately enhancing the performances of the battery. Non-limiting examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$, and a mixture thereof.

In the separator according to one aspect of the present invention, the binder polymer used to form the porous coating layer may be any one which is conventionally used in the formation of a porous coating layer. The binder polymer has preferably a glass transition temperature ($T_g$) of $-200$ to $200°$ C. so as to improve the mechanical properties such as flexibility and elasticity of the coating layer finally formed. Such a binder polymer plays a role of connecting and immobilizing inorganic particles therebetween, thereby preventing the mechanical property of the separator having the porous coating layer from being reduced.

Also, the binder polymer is not necessarily required to have ionic conductivity, however, a polymer having ionic conductivity may be used to improve the performances of electrochemical devices. Accordingly, the binder polymer used in the present invention preferably includes one having a high dielectric constant. Actually, the dissociation rate of a salt in an electrolyte solution depends on a dielectric constant of the electrolyte solution. Therefore, as the dielectric constant of the binder polymer is higher, the dissociation rate of a salt in an electrolyte solution increases. In this regard, in the present invention, the binder polymer may have a dielectric constant of 1.0 to 100 (measuring frequency=1 kHz), preferably 10 or higher.

In addition, the binder polymer may be gelatinized when impregnated with a liquid electrolyte solution to exhibit a high degree of swelling in an electrolyte solution. In this regard, it is preferred that the binder polymer has a solubility parameter of 15 to 45 MPa$^{1/2}$, more preferably 15 to 25

$MPa^{1/2}$, most preferably 30 to 45 $MPa^{1/2}$. Accordingly, a hydrophilic polymer having many polar groups is favorably used as compared to a hydrophobic polymer such as polyolefine. When the solubility parameter of the polymer is less than 15 $MPa^{1/2}$ or higher than 45 $MPa^{1/2}$, the polymer is difficult to be swelled by a conventional liquid electrolyte solution for a battery.

Non-limiting examples of the binder polymer include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and a mixture thereof.

The weight ratio of the inorganic particles and the binder polymer may be in the range of 50:50 to 99:1, preferably 60:40 to 90:10, more preferably 70:30 to 80:20.

Also, the thickness of the porous coating layer formed from the inorganic particles and the binder polymer is not particularly limited, but preferably 0.01 to 20 μm. Also, the pore size and the porosity of the porous coating layer are not particularly limited, but preferably, the pore size may be in the range of 0.01 to 10 μm, and the porosity may be in the range of 5 to 90%.

The separator according to one aspect of the present invention may further comprise other additives, in addition to the inorganic particles and polymer mentioned as the components of the porous coating layer.

In the separator of the present invention, the porous substrate on which the porous coating layer is formed may be any one which is conventionally used in the separator of an electrochemical device, for example, a polyolefin-based porous membrane or non-woven fabric, but is not limited thereto.

The polyolefin-based porous membrane may be obtained from a polyolefin-based polymer, for example, polyethylene such as high-density polyethylene, linear low-density polyethylene, low-density polyethylene and ultra-high molecular weight polyethylene, polypropylene, polybutylene, polypentene or a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalene and a mixture thereof. The non-woven fabric may be a spun-bond or melt-blown fabric consisting of a long fiber in structure.

The porous substrate has preferably a thickness of 5 to 50 μm, but is not particularly limited thereto. Also, the porous substrate has a pore size of 0.01 to 50 μm and a porosity of 10 to 95%, but is not particularly limited thereto.

In the porous coating layer, the binder polymer allows the adhesion of inorganic particles so that the inorganic particles can be bound with each other (i.e., the binder polymer connects and immobilizes the inorganic particles therebetween). Also, the porous coating layer comes in contact with the porous substrate by the binder polymer. In the porous coating layer, the inorganic particles are substantially present in contact with each other to form a closest packed structure, and an interstitial volume generated from the contact of the inorganic particles with each other becomes a pore of the porous coating layer.

Figure 2:
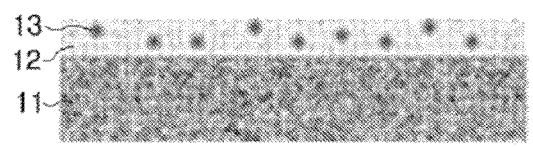
FIG. 2 schematically shows a separator according to one embodiment of the present invention.

Referring to FIGS. 1 and 2, in the separator according to one aspect of the present invention, a polyolefin-based porous membrane 1, 11 is used as a porous substrate, and a porous coating layer 2, 12 consisting of inorganic particles and a binder polymer may be formed on one or both surfaces of the porous substrate 1, 11. In vacant spaces between the inorganic particles formed in the porous coating layer, microcapsules 3, 13 containing an additive for improving the performances of an electrochemical device are dispersed.

Figure 3:
FIG. 3 schematically shows a separator according to one embodiment of the present invention.
Figure 4:
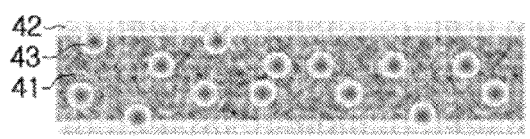
FIG. 4 schematically shows a separator according to one embodiment of the present invention.

Also, referring to FIGS. 3 and 4, a polyolefin-based non-woven fabric 31, 41 is used as a porous substrate, and a porous coating layer consisting of inorganic particles and a binder polymer may be formed by being impregnated into a pore part present in the porous substrate (FIG. 3, 32), or may be formed on one or both surfaces of the porous substrate (FIG. 4, 42).

As the polyolefin-based non-woven fabric used as a porous substrate has a pore size of 500 nm to 10 μm, which is much larger than that of the polyolefin-based porous membrane (about 100 nm or less), as shown in FIGS. 3 and 4, the microcapsules 33, 43 are dispersed in a pore area present in the non-woven fabric of the porous substrate 31, 41, rather than the porous coating layer.

Hereinafter, a method for preparing the separator according to one aspect of the present invention will be illustrated, but the present invention is not limited thereto.

First, microcapsules containing an additive for improving the performances of an electrochemical device are prepared.

The microcapsules may be obtained by way of a solvent evaporation, coacervation, interfacial polycondensation, in-situ polymerization, piezoelectric process, or spray drying process.

Among these, in the case of the solvent evaporation, an emulsion comprising polymer particles is formed, followed by evaporating an organic solvent used for dissolving the polymer particles, to finally obtain microcapsules.

The emulsion may be an oil-in-water (o/w) emulsion which is prepared by adding an oil phase obtained by dissolving a polymer in an organic solvent to a water phase obtained by dissolving a surfactant in water. Also, the emulsion may be prepared in various forms including a water-in-oil (w/o) emulsion, a water-in-oil-in-water (w/o/w) emulsion, and an oil-in-water-in-oil (o/w/o) emulsion.

In the case of using an oil-in-water (o/w) emulsion prepared by dissolving a surfactant in water, hydrophilic microcapsules may be obtained. Meanwhile, in the case of using a water-in-oil (w/o) emulsion prepared by dissolving a surfactant in an organic solvent, lipophilic microcapsules may be obtained. In the preparation of the hydrophilic microcapsules, an additive for improving the performances of an electrochemical device is added to the oil phase of the microcapsules, while in the preparation of the lipophilic microcapsules, the additive is added to the water phase of the microcapsules.

Meanwhile, the hydrophilic microcapsules may be introduced in the separator by using a hydrophilic binder, or by using a lipophilic binder after surface-modifying with a lipophilic silane coupling agent.

The organic solvent which may be used in the oil phase includes methylene chloride, toluene and hexane, and the surfactant includes gelatine, or polyethylene oxide-based or polyethylene glycol-based homopolymers or block copolymers such as Pluronic F127 (BASF) and Pluronic P123 (BASF).

After mixing one or more oil phase with one or more water phase as mentioned above, a phase separation occurs, and then a homogenization process is carried out by using a homogenizer at a high revolution speed of 2,000 to 15,000 rpm, to obtain a uniform emulsion.

For other methods for preparing porous microcapsules having a controlled release characteristic, their specific explanation are omitted herein since they are well-known in various arts.

Then, a binder polymer solution is prepared by dissolving the above-mentioned binder polymer in a solvent.

The solvent used in the binder polymer solution may have a solubility parameter similar to that of the binder polymer to be used and a low boiling point, so as to achieve uniform mixture and easy removal of the solvent afterward. Non-limiting examples of the solvent which may be used in the present invention include acetone, tetrahydrofuran, methylene chloride, chloroform, dimethylformamide, N-methyl-2-pyrrolidone (NMP), cyclohexane, water and a mixture thereof.

Subsequently, inorganic particles and the microcapsules are sequentially added to the binder polymer solution, to obtain a coating solution having the inorganic particles and the microcapsules dispersed therein.

Optionally, after adding the inorganic particles to the binder polymer solution, the inorganic particles may be pulverized. The pulverizing time is suitably in the range of 1 to 20 hours, and the pulverized inorganic particles have a diameter of 0.01 to 10 µm as mentioned above. The pulverizing may be carried out by a conventional method, for example, a ball mill method. The microcapsules are the last introduced after the pulverizing of the inorganic particles.

Meanwhile, in the case that the inorganic particles are coated with a coupling agent for their uniform dispersion in the binder polymer solution, the microcapsules and the inorganic particles are simply mixed in the binder polymer solution to obtain a coating solution.

Then, the coating solution comprising the microcapsules and the inorganic particles dispersed therein is applied on at least one surface of the porous substrate to form a coating layer.

The coating of the coating solution on the porous substrate may be carried out by various methods including dip coating, die coating, roll coating, comma coating and a combination thereof. Also, the porous coating layer may be optionally formed on one or both surfaces of the porous substrate.

If the coating solution contains a solvent, the coating layer requires a further drying procedure. The drying procedure may be carried out in a batch or continuous process by using an oven or heating chamber at a temperature range considering the vapor pressure of the used solvent.

The separator according to one aspect of the present invention thus prepared may be used as a separator of an electrochemical device, which is interposed between cathode and anode electrodes.

The electrochemical device of the present invention may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The separator according to one aspect of the present invention may be used together with any electrode which is not particularly limited, and the electrode may be manufactured by binding an electrode active material to an electrode current collector according to a conventional method known in the art. A cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials. Non-limiting examples of a cathode current collector include aluminum foils, nickel foils and a combination thereof. Non-limiting examples of an anode current collector include copper foils, gold foils, nickel foils, copper alloy foils and a combination thereof.

The electrochemical device according to another aspect of the present invention may use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents suitable for dissolving or dissociating the salt include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof, but are not limited thereto.

The electrolyte may be introduced in any suitable step during the manufacturing of the electrochemical device depending on the manufacturing processes and desired physical properties of a final product. Specifically, the electrolyte may be introduced before assembling a battery or in the final step of the assembling.

The separator according to one aspect of the present invention may be applied in a battery by conventional winding, lamination or stacking with an electrode, and folding processes.

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

EXAMPLE

Example 1-1

Preparation of Separator (1) Preparation of Microcapsules

10 Parts by weight of polystyrene (PS) was dissolved in 90 parts by weight of dichloromethane to obtain a dispersion solution (a). Also, 5 parts by weight of trimethyl phosphate as an additive for improving thermal stability, 0.5 parts by weight of gelatine as a surfactant, and 94.5 parts by weight of distilled water were mixed to obtain an aqueous solution (b). To 80 parts by weight of the aqueous solution (b), 20 parts by weight of the dispersion solution (a) was added to form an oil-in-water emulsion. Then, dichloromethane was dried for its removal, to obtain polystyrene microcapsules containing trimethyl phosphate. After washing with distilled water several times, the microcapsules were coated with glutaaldehyde so as to cross-link the gelatine surface of the microcapsules and minimize permeability, washed and dried again to finally obtain microcapsules having an average diameter of 1 μm.

(2) Preparation of Separator

5 Parts by weight of polyvinylidene fluoride-chlorotrifluoroethylene (PVdF-CTFE) copolymer was added to 95 parts by weight of acetone and dissolved at 50° C. for about 12 hours, to obtain a binder polymer solution. To 5 parts by weight of the binder polymer solution, $Al_2O_3$ powders and $BaTiO_3$ powders were added in a weight ratio of 9:1 so that the weight ratio of the polymer and the inorganic particles was 20:80, and then the inorganic particles were pulverized and dispersed by way of a ball mill method for 12 hours, to obtain a preparative slurry. Thereto, the microcapsules prepared above were added in an amount of 20 parts by weight based on 100 parts by weight of the total weight of the polymer and the inorganic particles, followed by again dispersing, to finally obtain a slurry.

The slurry thus prepared was coated in a thickness of about 10 μm on a 20 μm-thick porous polyethylene membrane (porosity 40%) by way of dip coating.

Example 1-2

Preparation of Separator (1) Preparation of Microcapsules

The procedures of step (1) of Example 1-1 were repeated except that triphenyl phosphate was used instead of trimethyl phosphate, to obtain microcapsules.

(2) Preparation of Separator

The procedures of step (2) of Example 1-1 were repeated using the microcapsules prepared in step (1) of this Example.

Example 1-3

Preparation of Separator (1) Preparation of Microcapsules

10 Parts by weight of polystyrene (PS) was dissolved in 90 parts by weight of dichloromethane to obtain a dispersion solution (a). Also, 5 parts by weight of vinylene carbonate as an additive for improving the performances of an electrochemical device, 0.5 parts by weight of gelatine as a surfactant, and 94.5 parts by weight of distilled water were mixed to obtain an aqueous solution (b). To 80 parts by weight of the aqueous solution (b), 20 parts by weight of the dispersion solution (a) was added to form an oil-in-water emulsion. Then, dichloromethane was dried for its removal, to obtain polystyrene microcapsules containing vinylene carbonate. The microcapsules were washed with distilled water several times to finally obtain microcapsules having an average diameter of 1 μm.

(2) Preparation of Separator

The procedures of step (2) of Example 1-1 were repeated using the microcapsules prepared in step (1) of this Example.

Example 2-1

Preparation of Electrochemical Device (Lithium Secondary Battery)

(1) Preparation of Cathode

90 Parts by weight of lithium-cobalt composite oxide as a cathode active material, 5 parts by weight of carbon black as a conductive material and 5 parts by weight of polyvinylidene fluoride (PVdF) as a binder were added to 40 parts by weight of N-methyl-2-pyrrolidone (NMP) which is a solvent, to obtain a cathode active material slurry. The cathode active material slurry were applied on a 100 μm-thick aluminum (Al) thin film as a cathode current collector, followed by drying, to obtain a cathode. Then, a roll pressing process was carried out.

(2) Preparation of Anode

Carbon powders as an anode active material, polyvinylidene fluoride (PVdF) as a binder, and carbon black as a conductive material were added in an amount of 95 parts by weight, 2 parts by weight, and 3 parts by weight, respectively, to 100 parts by weight of N-methyl-2-pyrrolidone (NMP) which is a solvent, to obtain an anode active material slurry. The cathode active material slurry were applied on a 90 μm-thick copper (Cu) thin film as an anode current collector, followed by drying, to obtain an anode. Then, a roll pressing process was carried out.

(3) Preparation of Lithium Secondary Battery

The cathode, anode and separator prepared above were assembled as a unit cell by way of stacking, and then an electrolyte solution (ethylene carbonate (EC)/propylene carbonate (PC)/diethyl carbonate (DEC)=3/2/5 (volume ratio), 1 mole of lithium hexafluorophosphate ($LiPF_6$)) was introduced, to obtain a lithium secondary battery.

Example 2-2

Preparation of Electrochemical Device (Lithium Secondary Battery)

The procedures of Example 2-1 were repeated except that the separator prepared in Example 1-2 was used, to obtain a lithium secondary battery.

Example 2-3

Preparation of Electrochemical Device (Lithium Secondary Battery)

The procedures of Example 2-1 were repeated except that the separator prepared in Example 1-3 was used, to obtain a lithium secondary battery.

Comparative Example 1

Preparation of Separator

The procedures of Example 1-1 were repeated except that no microcapsule was used, to obtain a separator.

Comparative Example 2

Preparation of Electrochemical Device (Lithium Secondary Battery)

The procedures of Example 2-1 were repeated except that the separator prepared in Comparative Example 1 was used, to obtain a lithium secondary battery.

Comparative Example 3

Preparation of Electrochemical Device (Lithium Secondary Battery)

The procedures of Example 2-1 were repeated except that the separator prepared in Comparative Example 1 was used and triphenyl phosphate was further added in an amount of 20 parts by weight based on 100 parts by weight of the electrolyte solution, to obtain a lithium secondary battery.

Test Example 1

Properties of Separator

The separators prepared in Examples 1-1, 1-2 and Comparative Example 1 were heated using a TPD-MASS spectrometer to raise their temperature, and then analyzed by GC. As a result, it was observed that trimethyl phosphate and triphenyl phosphate were released in the separator of Examples 1-1 and 1-2, respectively, at a temperature of 100 to 200° C. This means that the separators can effectively release an additive for improving thermal stability, such as trimethyl phosphate and triphenyl phosphate, when the inner temperature of an electrochemical device having the same highly increases.

Accordingly, when a lithium secondary battery equipped with the separator of Examples 1-1 or 1-2 is overcharged and its inner temperature increases to 200° C., trimethyl phosphate or triphenyl phosphate contained in the microcapsules of the separator is released in a gas state to trap a hydrogen or oxygen gas generated in a high temperature, thereby achieving the thermal stability of the secondary battery.

In contrast, since the separator of Comparative Example 1 has no microcapsule containing trimethyl phosphate, it fails to have thermal stability and flame retardancy, from which a lithium secondary battery having the separator of Comparative Example 1 cannot trap a hydrogen or oxygen gas at a high temperature of 200° C. or more, and thus it will be expanded gradually.

Test Example 2

Evaluation of Trimethyl Phosphate (TMP) and Triphenyl Phosphate in Electrolyte Solution Each of the separator of Example 1-1 containing trimethyl phosphate and the separator of Example 1-2 containing triphenyl phosphate was immersed in an electrolyte solution (ethylene carbonate (EC)/propylene carbonate (PC)/diethyl carbonate (DEC)=3/2/5 (volume ratio), 1 mole of lithium hexafluorophosphate (LiPF$_6$)) at 25° C. for 1,440 hours, and then components present in the electrolyte solution were analyzed by NMR. As a result, trimethyl phosphate and triphenyl phosphate were not detected.

From this, it was confirmed that each of the microcapsules cross-linked by glutaraldehyde effectively supports trimethyl phosphate and triphenyl phosphate.

Test Example 3

Evaluation for Performances of Secondary batteries

Lithium secondary batteries of Example 2-2 (having the separator of Example 1-2) and Comparative Example 3 (having a separator comprising no microcapsule and using an electrolyte solution containing triphenyl phosphate therein) were evaluated for their performances under the charging/discharging condition of 1 C/1 C.

As a result, in initial cycles, the discharging capacity of the lithium secondary battery of Example 2-2 was maintained, whereas that of the lithium secondary battery of Comparative Example 3 was surprisingly reduced.

From this, it was confirmed that in the lithium secondary battery of Comparative Example 3 wherein an additive for improving thermal stability such as triphenyl phosphate is directly exposed in an electrolyte solution, a side reaction occurs in the electrolyte solution to reduce discharging capacity during the charging/discharging cycles at room temperature, whereas in the lithium secondary battery of Example 2-2, triphenyl phosphate is supported in microcapsules and does not come into direct contact with an electrolyte solution at room temperature, and then is released into the outer of the microcapsules later when the secondary battery is subject to an overcurrent or high temperature condition due to its abnormal operation, thereby improving the thermal stability of the secondary battery.

What is claimed is:

1. A separator, comprising:
   a porous substrate having multiple pores;
   a porous coating layer formed on at least one area selected from at least one surface of the porous substrate and the pores of the porous substrate, and comprising multiple inorganic particles and a binder polymer, the binder polymer being existed on a part or all of the surface of the inorganic particles to connect and immobilize the inorganic particles therebetween; and
   microcapsules dispersed in at least one area selected from the pores of the porous substrate and pores formed by vacant spaces between the inorganic particles present in the porous coating layer, and containing therein an additive for improving the performances of an electrochemical device.

2. The separator according to claim 1, wherein the additive for improving the performances of an electrochemical device is at least one selected from the group consisting of an additive for forming a solid electrolyte interface, an additive for inhibiting a side reaction occurring in a battery, an additive for improving thermal stability, an additive for inhibiting overcharging, and a mixture thereof.

3. The separator according to claim 2, wherein the additive for forming a solid electrolyte interface is at least one selected from the group consisting of vinylene carbonate, vinylethylene carbonate, a cyclic sulfite, a saturated sultone, an unsaturated sultone, a non-cyclic sulfone, a derivative thereof, and a mixture thereof.

4. The separator according to claim 2, wherein the additive for inhibiting a side reaction occurring in a battery is at least one selected from the group consisting of ethylenediaminetetraacetic acid, tetramethylethylenediamine, pyridine, dipyridyl, ethylbis(diphenylphosphine), butyronitrile, succinonitrile, iodine, ammonium halide, a derivative thereof, and a mixture thereof.

5. The separator according to claim 2, wherein the additive for improving thermal stability is at least one selected from the group consisting of hexamethyldisiloxane, hexamethoxycyclotriphosphazene, hexamethylphosphoramide, cyclohexylbenzene, biphenyl, dimethylpyrrole, trimethyl phosphate, triphenyl phosphate, a derivative thereof, and a mixture thereof.

6. The separator according to claim 2, wherein the additive for inhibiting overcharging is at least one selected from the group consisting of n-butyl ferrocene, a halogen-substituted benzene derivative, cyclohexylbenzene, biphenyl, and a mixture thereof.

7. The separator according to claim 1, wherein the additive for improving the performances of an electrochemical device is used in an amount of 2 to 20 parts by weight based on 100 parts by weight of the total weight of the inorganic particles and the binder polymer.

8. The separator according to claim 1, wherein the microcapsules are spherical polymer particles, core/shell-type polymer particles, or blended polymer particles.

9. The separator according to claim 1, wherein the microcapsules further comprise a coating layer formed with inorganic particles thereon.

10. The separator according to claim 1, wherein the microcapsules has their surface consisting of a cross-linked polymer.

11. The separator according to claim 1, wherein the microcapsules have an average diameter of 100 nm to 10 μm.

12. The separator according to claim 1, wherein the microcapsules containing the additive for improving the performances of an electrochemical device are comprised in an amount of 5 to 50 parts by weight based on 100 parts by weight of the total weight of the inorganic particles and the binder polymer.

13. The separator according to claim 1, wherein the weight ratio of the additive for improving the performances of an electrochemical device and the microcapsules containing the additive is in the range of 1:1.5 to 1:25.

14. The separator according to claim 1, wherein the porous substrate is in the form of a porous membrane or non-woven fabric made of a polyolefin-based polymer.

15. The separator according to claim 1, wherein the porous substrate is obtained from at least one selected from the group consisting of a high-density polyethylene, a low-density polyethylene, a linear low-density polyethylene, an ultra-high molecular weight polyethylene, polypropylene, polyethylene terephthalate, polybutylene terephthalate, polyester, polyacetal, polyamide, polycarbonate, polyimide, polyetheretherketone, polyethersulfone, polyphenyleneoxide, polyphenylenesulfidro, polyethylenenaphthalene, and a mixture thereof.

16. The separator according to claim 1, wherein the inorganic particles are at least one selected from the group consisting of inorganic particles having a dielectric constant of 5 or higher, inorganic particles having the ability to transport lithium ions, and a mixture thereof.

17. The separator according to claim 16, wherein the inorganic particles having a dielectric constant of 5 or higher are at least one selected from the group consisting of $BaTiO_3$, $Pb(Zr_x, Ti_{1-x})O_3$ (PZT, $0<x<1$), $Pb_{1-x}La_xLa_xZr_{1-y}Ti_yO_3$ (PLZT, $0<x<1$, $0<y<1$), $(1-x)Pb(Mg_{1/3}Nb_{2/3})O_{3-x}PbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof.

18. The separator according to claim 16, wherein the inorganic particles having the ability to transport lithium ions are at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles, and a mixture thereof.

19. The separator according to claim 1, wherein the binder polymer is at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and a mixture thereof.

20. The separator according to claim 1, wherein the weight ratio of the inorganic particles and the binder polymer is in the range of 50:50 to 99:1.

21. An electrochemical device, comprising a cathode, an anode and a separator interposed between the cathode and the anode, wherein the separator is the separator according to claim 1.

22. The electrochemical device according to claim 21, which is a lithium secondary battery.

* * * * *